April 17, 1951 R. L. CARBREY 2,549,422

DECODER FOR MULTIPLE CARRIER PULSE CODE MODULATION SIGNALS

Filed Jan. 6, 1949 2 Sheets-Sheet 1

INVENTOR
R. L. CARBREY
BY George C. Lord
ATTORNEY

DECODER FOR MULTIPLE CARRIER PULSE CODE MODULATION SIGNALS

Filed Jan. 6, 1949

2 Sheets-Sheet 2

INVENTOR
R. L. CARBREY
BY George C. Lord
ATTORNEY

Patented Apr. 17, 1951

2,549,422

UNITED STATES PATENT OFFICE 2,549,422

DECODER FOR MULTIPLE CARRIER PULSE CODE MODULATION SIGNALS

Robert L. Carbrey, Summit, N. J., assignor to Bell Telephone Laboratories, Incorporated, New York, N. Y., a corporation of New York Application January 6, 1949, Serial No. 69,528

9 Claims. (Cl. 179—15)

Figure 1:
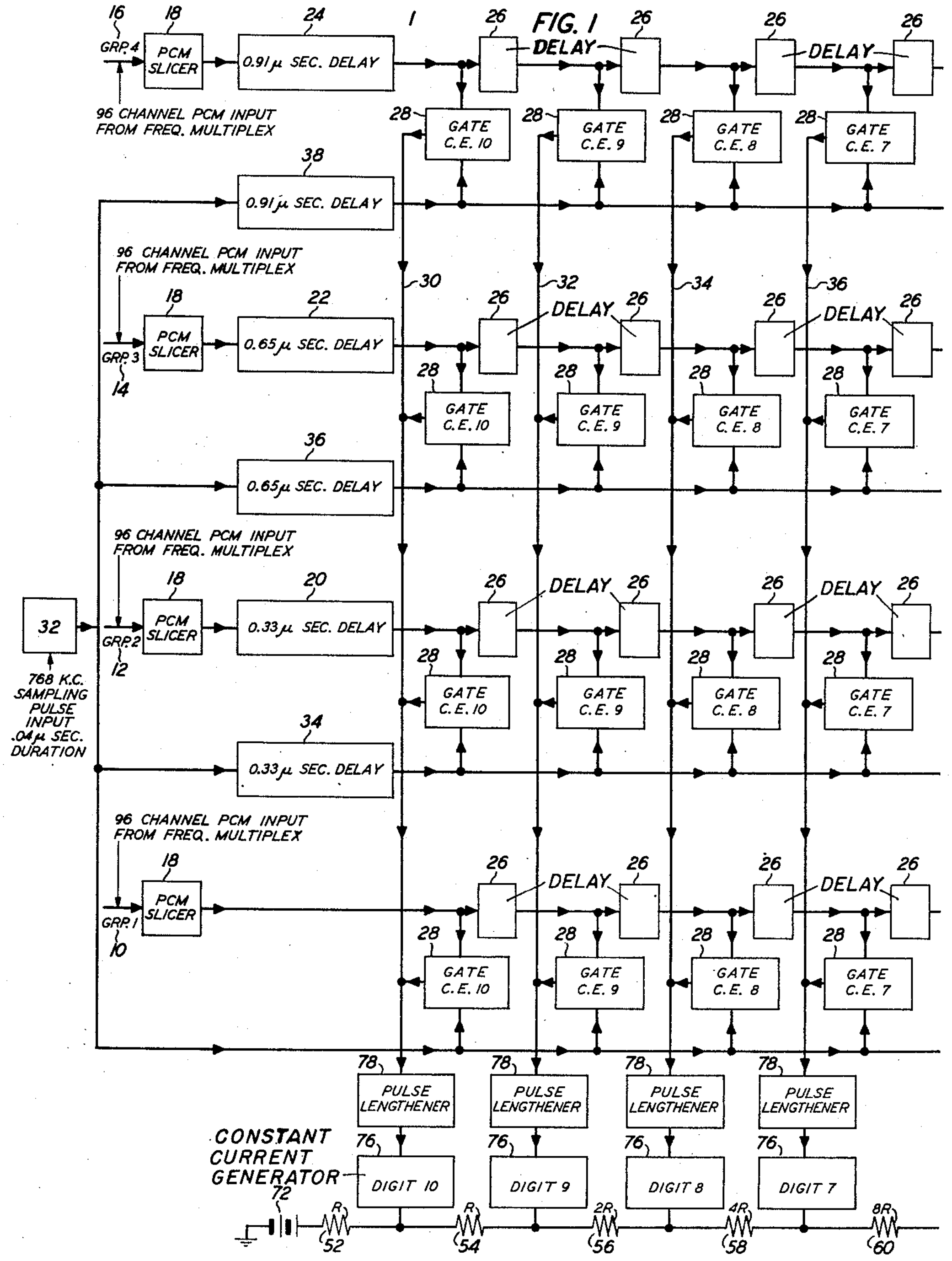

This invention relates to receiving equipment for decoding multichannel pulse code modulation.

In communication systems utilizing what is known as pulse code modulation, a speech wave or other signal to be transmitted is sampled periodically to ascertain its instantaneous amplitude. The measured instantaneous amplitude is expressed by pulse codes analogous to telegraph codes.

One code which conveniently may be employed in pulse code modulation involves permutations of a fixed number of code elements each of which may have any one of several conditions or values. An advantageous code of this type is the so-called binary code in which each of the fixed number of code elements may have either of two values. One way of representing these values is to represent one by a pulse sometimes referred to as an "on pulse" and the other by the absence of a pulse sometimes referred to as an "off pulse." Alternatively, one value may be represented by a positive pulse and the other by a negative pulse. The total number of permutations obtainable with the binary code is proportional to $2^n$ where $n$ is the number of code elements employed.

Because the total number of different amplitudes which may be represented by such a code of a fixed number of elements is limited, it is found desirable to divide the continuous range of amplitude values of which the transmitted signal is capable into a fixed number of constituent ranges which together encompass the total range. Each of these smaller or constituent amplitude ranges may then be treated as if it were a single amplitude instead of a range and is represented by an individual one of the permutations of the code. In the use of this method of pulse code modulation the instantaneous amplitude ascertained by a sampling operation is represented by the respective permutation indicative of the amplitude range, or step, which most nearly approximates the amplitude of the message sample. If, for example, the sample amplitude is nearest to that amplitude represented by the ninth step of the signal amplitude range the permutation code corresponding to range 9 is transmitted.

It will be observed that each code element in one of its values repreesnts the presence in sampled amplitude of a particular fixed portion of the total amplitude range, while in the other value it represents the absence of that same portion. The code element pulses may be transmitted by either time or frequency division multiplex. Conveniently, and in many of the known code pulse modulation systems the code group pulses are transmitted by time division multiplex and in some instances the code element pulses for a plurality of different messages are transmitted over the same system by interleaving them in time. There is, however, a limit to the extent to which this process may be utilized since it is a fundamental principle of time division transmission that message signals must be sampled at a repetition rate which is at least twice the frequency of the highest component which it is desired to transmit. As accommodation for additional messages is added by time division it becomes necessary to shorten the code element pulses with the ultimate result that impracticably short code element pulses are required.

One means of circumventing this limitation involves the transmission of pulse code modulation signals by a combination of time and frequency division multiplex. Thus, for example, if it is desired to transmit 384 different messages, the messages are interleaved by time division in groups of 96 messages each and the necessary four groups of time division message channels are transmitted over four different frequency channels. This may be accomplished by providing a separate coding device for each of the frequency channels, each of these coding devices being capable of operating at a sufficiently high speed to handle 96 different message signals. The receiver for such a transmission system could conceivably comprise a separate decoder for each frequency channel with its group of 96 message signals and in many instances it may be desirable to employ two or more decoders for each 96 message signal group. However, certain decoding circuits have been devised which are capable of accepting and decoding message signal code groups at very high rates of speed.

Accordingly, it is the object of the present invention to provide decoding equipment wherein a single high speed decoder is arranged to accept and decode the information transmitted over a plurality of different frequency channels each of which carries a plurality of different messages transmitted by time division.

In the decoding equipment in accordance with the invention, apparatus is provided for accepting the pulses of a code group simultaneously in separate input circuits and providing a representative output for each such code group. Corresponding code groups occurring in the several frequency division transmission links are applied to the single decoding circuit by first adjusting the times of occurrence of the code groups in each of the links in relation to those in the other links so that they are staggered in time by fractions of the period of a single code group. Preferably they are so staggered that corresponding code element pulses from the several links are equally spaced in a period equal to the code group period. The pulses of the code groups of each of the links are then applied to separate distributors which make the pulses available simultaneously in separate output circuits and the output circuits for each code element for each transmission link are connected to the corresponding input circuits of the single decoding apparatus.

Figure 2:
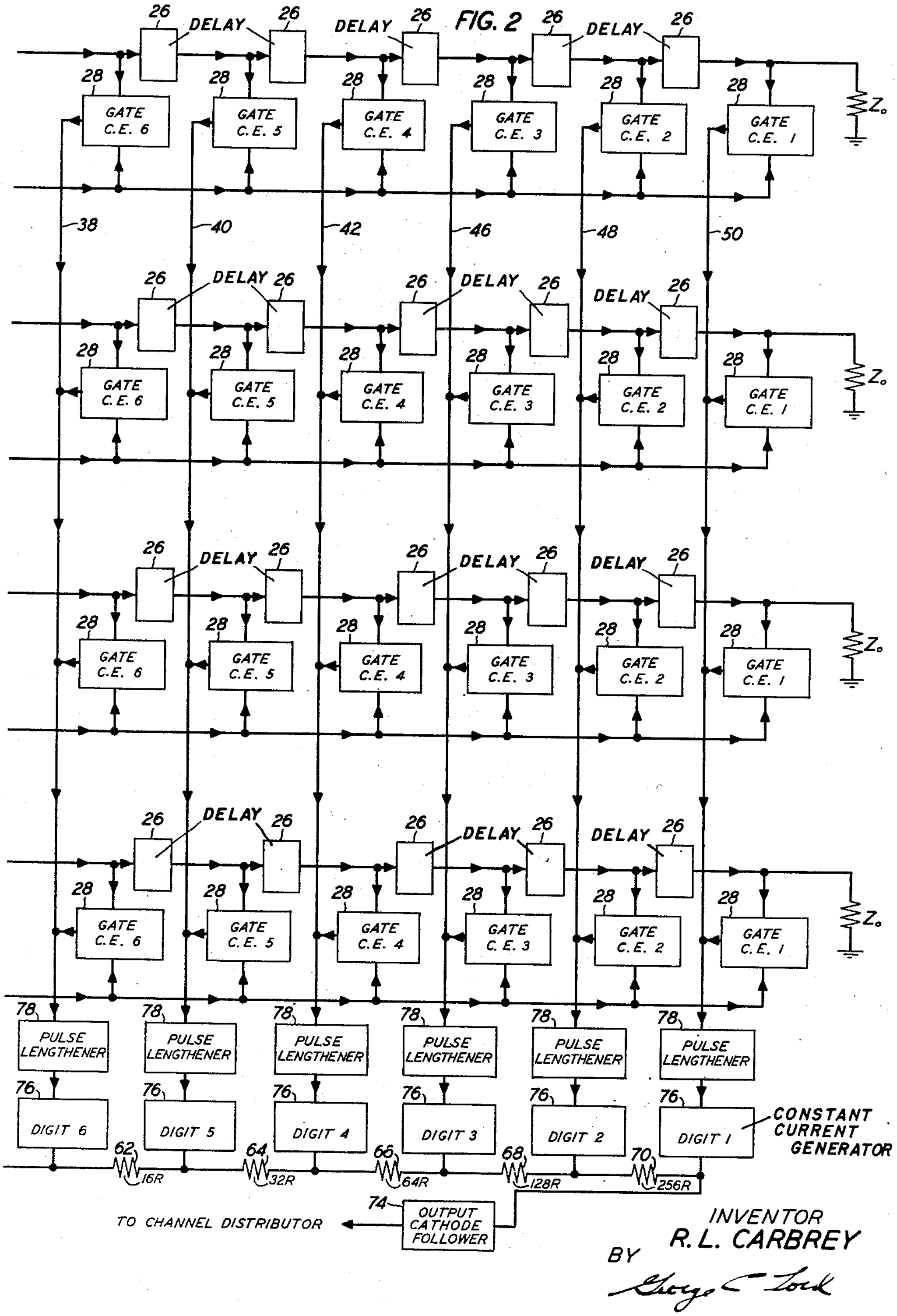

The above and other features of the invention will be described in detail in the following specification taken in connection with the drawings in which:

Figs. 1 and 2 when placed together, with Fig. 2 to the right of Fig. 1, comprise a block schematic diagram of decoding apparatus in accordance with the invention.

In the decoding equipment shown by way of example in the drawings provision is made for accepting and decoding the pulse code modulation signals corresponding to 384 different messages, these code groups being transmitted over four frequency division links, each of which carries the code groups for 96 different messages on a time division multiplex basis. It is assumed that the 96 message channels for each frequency division link are transmitted consecutively and that corresponding code groups in each link are transmitted simultaneously. It is further assumed that each code group comprises 10 code elements and that in these code groups the code element representing the highest denominational order of the code is transmitted first, followed consecutively by the code elements representing successively lower denominational orders. Thus, in each code group the first pulse transmitted represents the presence or absence of one-half the total possible amplitude range of which the message wave is capable, while the last code element transmitted represents the presence or absence of one 1024th part of the total amplitude range.

The input signals from the four frequency division transmission links 10, 12, 14 and 16 are applied to pulse-shaping equipment 18 which is provided for each link and comprises clipping, limiting or slicing circuits arranged to improve the pulse form and to remove any distortions as to pulse timing introduced in the transmission link. The pulse outputs of the four shaping circuits 18 are applied to equipment arranged to stagger corresponding pulses of corresponding code groups to occur at equal intervals throughout an interval equal to the period of one such code group. If a sampling rate of 8 kilocycles per second is assumed, the multiplex frame is 125 microseconds, each code group in each 96-channel link has allotted to it a period of 1.3 microseconds, and each of the ten code element pulses of these code groups occupies an interval of 0.13 microsecond. As shown, the corresponding pulses of corresponding code groups appearing at the outputs of the four pulse-shaping circuits 18 are staggered in time by a series of delay lines. If the pulses from link 10 are taken as a reference, those from links 12, 14 and 16 are subjected to delays equal respectively to 0.33, 0.65 and 0.97 microsecond introduced by delay lines 20, 22 and 24. Thus, corresponding pulses of corresponding code groups from the four transmission links are equally spaced throughout a 1.3 microsecond code group period. In the general case where code groups of period $t$ are distributed for transmission among $m$ transmission links, delay devices are provided to adjust the times of the pulses from the $m$ links so that with respect to the code element pulses from one link, corresponding code element pulses from the remaining links follow at intervals equal respectively to $$\frac{t}{m}, \frac{2t}{m}, \ldots \frac{(m-1)t}{m}$$

The circuits associated with each of delay lines 20, 22 and 24 and that associated directly with the output of the shaping circuit 18 for link 10 are identical in every respect and only that associated with delay line 24 will be considered in detail. The delayed code element pulses appearing in the output of delay line 24 are applied to a collecting circuit comprising $(n-1)$ delay devices 26 connected in series and each capable of introducing a delay equal to the 0.13-microsecond interval assigned to each code element of a code group. The delay line comprising the tandem connection of these delay circuits is terminated in its characteristic impedance $Z_0$ to prevent spurious reflections. Connections are made at the outputs of delay line 24 and each of delay devices 26 and a gating or switching circuit 28 is connected in each of the output circuits so provided. Each of switching circuits 28 may comprise a vacuum tube having at least two control grids. The output signal from the associated delay circuit is applied to one of the grids and the tube is enabled or gated by an auxiliary gating pulse applied to the other grid to produce an output signal proportional to the input signal applied to the first-mentioned grid. It will be recognized that when the consecutive pulses of a code group are applied to the delay line comprising delay devices 26, each of the pulses will travel down the line, being delayed by an interval equal to the pulse interval each time a delay network 26 is traversed. Consequently, at the time at which the final pulse appears at the output of group delay line 24, the ten pulses of the code group are available simultaneously at the input connections to gating circuits 28. If the gating circuits are simultaneously enabled at this time, output pulses corresponding to the ten code elements will appear simultaneously in separate circuits represented by leads 30 through 50 connected to the outputs of the ten gate circuits 28.

The corresponding code groups from transmission links 10, 12 and 14 are applied to similar collecting and gating equipment for each link with the result that the code element pulses of corresponding code groups of these channels may also be made available simultaneously on leads 30 through 50 at certain intervals. If the code element pulses of a particular code group from transmission link 10 are chosen as a reference and are caused to appear simultaneously on leads 30 through 50 at a particular instant by a gating pulse applied to the ten gate circuits associated with that link at that instant, the ten code elements of the corresponding code group from link 12 can be made available by enabling the gates associated with that link simultaneously 0.33 microsecond later, while the corresponding pulses for links 14 and 16 may be made available by enabling the corresponding gate circuits successively at intervals of approximately 0.3 microsecond.

The gate circuits 28 may be enabled by pulses from a pulse generator 32 which may, for example, comprise a conventional multivibrator as shown at page 512 of "Radio Engineers' Handbook" by F. E. Terman having a repetition rate of 768 kilocycles per second and arranged to produce pulses of duration which is short with respect to that of the code element pulses. This pulse generator may be synchronized with the transmitter by known methods. These pulses, which occur at the code group rate for any link, may be applied directly without delay to the gate circuits associated with frequency link 10 and may be applied at the requisite intervals to the gate circuits associated with the remaining frequency channels through the use of delay lines 34, 36 and 38 introducing delays which are respectively equal to those introduced in the code element pulses by delay lines 20, 22 and 24.

The equipment thus far described thus operates to accept simultaneously four 96-channel time division input signals and to distribute the code element pulses thereof among the ten leads 30 through 50 in such fashion that pulses corresponding to the 384 code groups appear code group by code group simultaneously and consecutively on leads 30 through 50, the first code group from transmission link 10 being followed by the first from transmission link 12 etc. and the first code group from transmission link 16 being followed by the second code group of transmission link 10.

Leads 30 through 50 are connected to the ten inputs of a so-called simultaneous decoder which is arranged to accept the code element pulses of a code group in separate inputs and to produce a single output pulse, the amplitude of which corresponds to that represented by the code group. Such a decoder may as disclosed in my copending application, Serial No. 783,187 filed October 30, 1947, comprise a plurality of resistors 52, 54, 56, 58, 60, 62, 64, 66, 68 and 70 equal in number to the code elements of the code groups and connected in series between a source of positive potential here shown as a battery 72 and an output circuit which may comprise a cathode follower 74. The battery 72 has a potential equal to the total possible amplitude represented by the code and the resistances are so proportioned that the total resistances between the source of potential and the ends of successive resistors remote therefrom are related as increasing powers of two. Constant current circuits 76 which may conveniently comprise pentode-type vacuum tubes having unbypassed cathode resistors as disclosed, for example, in Patent 2,180,364 to F. R. Norton, November 21, 1939, are connected to the ends of the resistors of the network remote from the source of positive potential and are arranged normally to draw equal currents from said source through the corresponding portions of the resistance network. Thus, initially, the constant current circuit for the final code element corresponding to the smallest increment of amplitude of which the code is capable draws one unit of current through a total resistance of R, while the constant current circuits corresponding to code elements of successively higher denominational order draw currents to produce drops of 2R, 4R, 8R, 16R, 32R, 64R, 128R, 256R and 512R respectively. The total drop thus produced between the source of positive potential 60 and the output circuit 62 is thus equal to 1023 R corresponding to the amplitude range, (0 to 1023 units inclusive) of which the code is capable.

The constant current circuits 76 are turned off by "on" pulses appearing on the corresponding leads 30 through 50. Since, however, the gating circuits are enabled to produce extremely short output pulses for the purpose of eliminating distortions produced during transmission and by delay devices 26, it is convenient first to lengthen the pulses from leads 30 through 50 to insure certain operation of the constant current circuits. The pulses are thus applied to pulse lengthening circuits 78 which may comprise the combination of a number of pulse length doublers of the type disclosed in copending application Serial No. 577,954, filed February 15, 1945, now Patent No. 2,457,559 to G. H. Huber, December 28, 1948, wherein the pulses are applied to a short-circuited delay line of such length that pulses are reflected back to the input after a delay equal to the original pulse length and added to the original pulses to obtain pulses of twice the original length.

When "on" pulses appear upon one or more of leads 30 through 50, the corresponding constant current circuits are turned off and cease to draw currents from the source of potential 72 through the corresponding portions of the resistance network. The total drop is thus reduced in proportion to the portion of the total possible amplitude represented by the "on" pulses of the code group appearing on leads 30 through 50 at any particular time and the remainder, being the battery potential less this drop and corresponding to the sample amplitude, appears in the output amplifier 74.

Since the code groups of the four 96-channel links appear one after the other on leads 30 through 50, output pulses appear consecutively in output cathode follower 74 corresponding to the instantaneous amplitudes of the 384 message signals and may be applied through suitable distributing equipment to a like number of output circuits. It is thus apparent that a single high speed decoding circuit may be utilized to decode a very large number of message channels, or to decode a signal from a very wide band source, such as television, which was transmitted as time division groups over a plurality of frequency multiplexed channels.

In the above, it has been assumed that corresponding code groups of the four frequency division channels are transmitted simultaneously. It is obvious, of course, that if these code groups are not transmitted simultaneously suitable adjustments may be made in the values of delay lines 20, 22 and 24 to bring corresponding pulses of corresponding code groups into time coincidence for application to the several pulse collecting delay line networks.

What is claimed is:

1. Apparatus for decoding a plurality of code groups each of $n$ equally spaced code element pulses of equal length, said code groups being distributed among a plurality of separate transmission channels comprising, a decoder arranged to accept the $n$ pulses of a code group simultaneously on separate input connections and to produce an output corresponding to said code group, means for spacing corresponding pulses of corresponding code groups from said separate channels to occur at equal intervals during a period equal to that occupied by a code group in said channels, means at the output of said spacing means of each channel for obtaining the $n$ pulses of the code groups therefrom simultaneously in $n$ separate circuits, and means for applying the pulses from the $n$ simultaneous outputs of each of said last-mentioned means to the corresponding input connections of said decoder.

2. Apparatus for decoding a plurality of $n$ element code groups of frame period $t$, said code groups being distributed for transmission among $m$ separate transmission links comprising an $n$ element decoder arranged to accept the code element pulses of a code group simultaneously in separate input circuits and to produce an output corresponding to each code group, means for adjusting the code group pulses from the $m$ links so that with respect to the code groups in one link corresponding code groups in the remaining links follow after intervals respectively equal to approximately $$\frac{t}{m}, \frac{2t}{m}, \ldots \frac{(m-1)t}{m}$$

means at the output of the adjusting means for each link for collecting the pulses of each code group in that link into time coincidence and distributing them to separate circuits corresponding to the $n$ code elements, and means connecting said separate circuits for each link for each code element to the corresponding input circuit of said simultaneous decoder.

3. Apparatus for decoding a plurality of $n$ element code groups of frame period $t$, said code groups being distributed for transmission among $m$ separate transmission channels, $m$ being equal to or less than $n$, comprising an $n$ element decoder arranged to receive the code element pulses of a code group simultaneously in separate input circuits and to produce an output corresponding to each code group, delay lines in the output of each of said transmission channels except one arranged to introduce delays in the pulses from said channels with respect to those from said one transmission channel equal respectively to approximately $$\frac{t}{m}, \frac{2t}{m}, \ldots \frac{(m-1)t}{m}$$

a distributor at the output of each of said delay lines for distributing the code element pulses therefrom to occur simultaneously in $n$ separate circuits corresponding to the $n$ elements of a code group and means interconnecting said separate circuits associated with each transmission channel for each code element to the corresponding input circuit of said decoder.

4. Apparatus for decoding a plurality of code groups each of $n$ pulses occurring at equal intervals within a frame period $t$, said code groups being distributed among a plurality of separate transmission channels comprising, a decoder arranged to accept the $n$ pulses of a code group simultaneously on separate input connections and to produce an output corresponding to each code group, means for spacing the corresponding pulses of corresponding code groups from said separate channels at equal intervals during a period equal to that of a code group in said channels, a series of delay devices connected in series to the output of said spacing means for each of said transmission channels to introduce in the pulses from said spacing means successive delays equal to the pulse intervals of said code groups, electronic switches connected to the output of each of said delay devices and an electronic switch connected to the output of said spacing means and said electronic switches being operative respectively to connect pulses occurring at said outputs to the $n$ code element inputs of said decoder, and means associated with the switching devices for each of said transmission channels for operating said switching devices at the conclusion of a code group from such channel.

5. Apparatus for decoding a plurality of code groups each of $n$ pulses occurring at equal intervals within a frame period $t$, said code groups being distributed among a plurality of separate transmission channels comprising, a decoder arranged to accept the $n$ pulses of a code group simultaneously on separate input connections and to produce an output corresponding to each code group, means for spacing the corresponding pulses of corresponding code groups from said separate channels at equal intervals during said frame period $t$, a series of delay devices connected in series to the output of said spacing means for each of said transmission channels to introduce successive delays equal to the pulse intervals of said code groups in pulses from said spacing means, gate circuits connected between the output of said spacing means and of said delay devices respectively and the corresponding $n$ input connections of said decoder for each transmission channel, means for enabling the gate circuits for each transmission channel at the conclusion of a code group therefrom for an interval which is short as compared to the length of the code element pulses, and means in the inputs of said decoders for lengthening pulses applied thereto from said gate circuits.

6. Apparatus for decoding a plurality of code groups each of $n$ equally spaced code element pulses of equal length, said code groups being distributed for transmission among a plurality of separate channels, comprising a decoder arranged to accept the $n$ pulses of a code group simultaneously in separate input circuits and to produce a decoded output for each code group, means for spacing the corresponding pulses of corresponding code groups from said separate channels to occur at equal intervals during a period equal to that of a code group in said channels, $(n-1)$ delay devices connected to the output of each of said channels and arranged to introduce successive delays equal to the pulse intervals of said code groups, electronic switches connected respectively between the output of said spacing means and between the outputs of each of said delay lines of each channel and the $n$ input circuits of said decoder, and means for operating said switches for each channel simultaneously to apply the $n$ pulses of decoder groups from a particular channel to the $n$ input circuits of said decoder.

7. Apparatus for decoding a plurality of code groups each of $n$ equally spaced pulses of equal length, said code groups being distirbuted for transmission among a plurality of separate channels, comprising means for spacing corresponding code element pulses of corresponding code groups from said separate channels to occur at equal intervals during a period equal to that occupied by a code group of said channels, means at the output of said spacing means for said channels for distributing the $n$ pulses of the code groups therefrom to occur simultaneously in $n$ separate circuits, means interconnecting the corresponding ones of said $n$ separate circuits for each channel to a decoding circuit having $n$ separate inputs corresponding to the code elements of said code groups and comprising $n$ resistors connected in series between a source of potential and an output circuit, said resistors being proportioned to provide total resistance between said source of potential and the ends of successive resistors remote from said source of potential related as increasing powers of two, a constant current circuit connected to the ends of each of said resistors remote from said source of potential and corresponding to said $n$ code elements, said constant current circuits being responsive respectively to input pulses in said $n$ input circuits of said decoder to draw equal currents through the corresponding portions of said resistance network from said source of potential to produce a decoded output signal in said output circuit.

8. Apparatus for decoding a plurality of $n$ element code groups of frame period $t$, said code groups being distributed for transmission among $m$ separate channels, $m$ being equal to or less than $n$, comprising an $n$ element decoder arranged to accept the pulses of a code group simultaneously in separate input circuits and to produce a decoded output for each code group, delay lines in the outputs in each of said channels except one for introducing delays in the code pulses therefrom with respect to the pulses in said one channel equal respectively to approximately $$\frac{t}{m}, \frac{2t}{m}, \ldots \frac{(m-1)t}{m}$$

a series of delay lines connected in the outputs of each of said first-mentioned delay lines and arranged to introduce successive delays equal to the pulse intervals of said code group, a similar series of delay lines connected in the output of said one channel, gate circuits connected to the output of said one channel, the outputs of said first-mentioned delay lines and the outputs of each of said last-mentioned delay lines to complete circuits therefrom to the $n$ respective input circuits of said decoder, a source of enabling pulses for said gate circuits occurring at the code group repetition rate for said one channel, means for applying said pulses to the gates associated with said one channel simultaneously, and means for delaying said pulses for application to the gates of the remaining ones of said channels by the same amounts as the code pulses from said channels are delayed with respect to those from said one channel.

9. Apparatus for decoding a plurality of code groups each of $n$ equally spaced code element pulses of equal length, said code groups being distributed among a plurality of separate transmission channels comprising a decoder arranged to accept the $n$ pulses of a code group simultaneously on separate input connections and to produce an output corresponding to said code group, means introducing delays to space corresponding pulses of corresponding code groups from said separate channels to occur at equal intervals during a period equal to that occupied by a code group in said channels, means at the output of said spacing means for each channel for obtaining the $n$ pulses of the code groups therefrom simultaneously in $n$ separate circuits, a gate circuit for each of the $n$ separate circuits for each channel and means for enabling all gate circuits for each channel simultaneously to apply the simultaneous pulses for the code groups from each channel in turn to said decoder, said enabling means comprising a pulse generator operating at the code group repetition rate for one of said channels and delay units introducing delays respectively equal to those produced by said delay means connected between the output of said pulse generator and the gate circuits for the corresponding channels.

ROBERT L. CARBREY.

REFERENCES CITED

The following references are of record in the file of this patent:

UNITED STATES PATENTS

| Number | Name | Date |
|---|---|---|
| 1,963,600 | Voss | June 19, 1934 |
| 2,244,500 | Nyquist | June 3, 1941 |
| 2,380,894 | Colman | July 31, 1945 |
| 2,453,461 | Schelleng | Nov. 9, 1948 |